S. T. WHITE.
MECHANICAL MOVEMENT.
APPLICATION FILED SEPT. 30, 1916.

1,300,312.

Patented Apr. 15, 1919.
3 SHEETS—SHEET 3.

Witnesses:

Inventor:
Samuel T. White
By Frank D. Thomason
Atty.

UNITED STATES PATENT OFFICE.

SAMUEL T. WHITE, OF DAVENPORT, IOWA.

MECHANICAL MOVEMENT.

1,300,312.　　　　Specification of Letters Patent.　　Patented Apr. 15, 1919.

Application filed September 30, 1916.　Serial No. 122,972.

*To all whom it may concern:*

Be it known that I, SAMUEL T. WHITE, a citizen of the United States, residing at Davenport, in the county of Scott and State of Iowa, have invented new and useful Improvements in Mechanical Movements, of which the following is a full, clear, and exact description.

My invention relates to mechanical movements, and particularly to movements in washing machines employing intermittent rotating vacuum cups to agitate the wash.

The object of my invention is, primarily, to apply an oscillating lever actuated mechanism to vertically reciprocate and intermittently rotate said vacuum cups, secondly, to utilize a geared up balance-wheel in connection with this mechanism to impart to said agitator cups a steady rhythmical movement, thirdly, to provide a cushioned connection between the intermittently rotatable shaft that actuates the said cups and the mechanism actuating the same, and fourthly, to provide vacuum cups from which there is an egress of air as they move in one direction and an ingress of air when moved in the other direction to enable them to lift and then release the articles in the wash as they move up and down. These and other objects I accomplish by the means hereinafter fully described, and as particularly pointed out in the claims.

In the drawings:—

Figure 1:
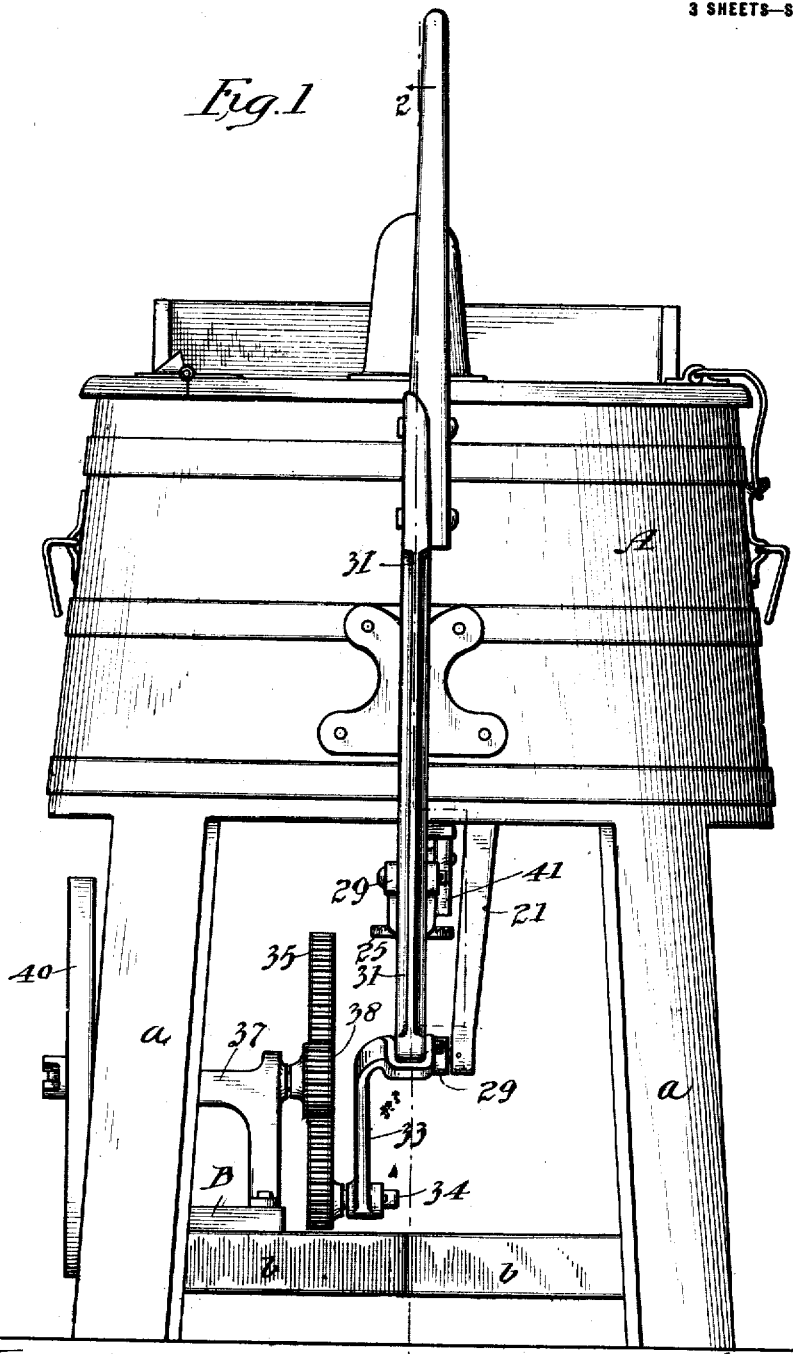
Figure 1 is a front elevation of my invention.
Figure 2:
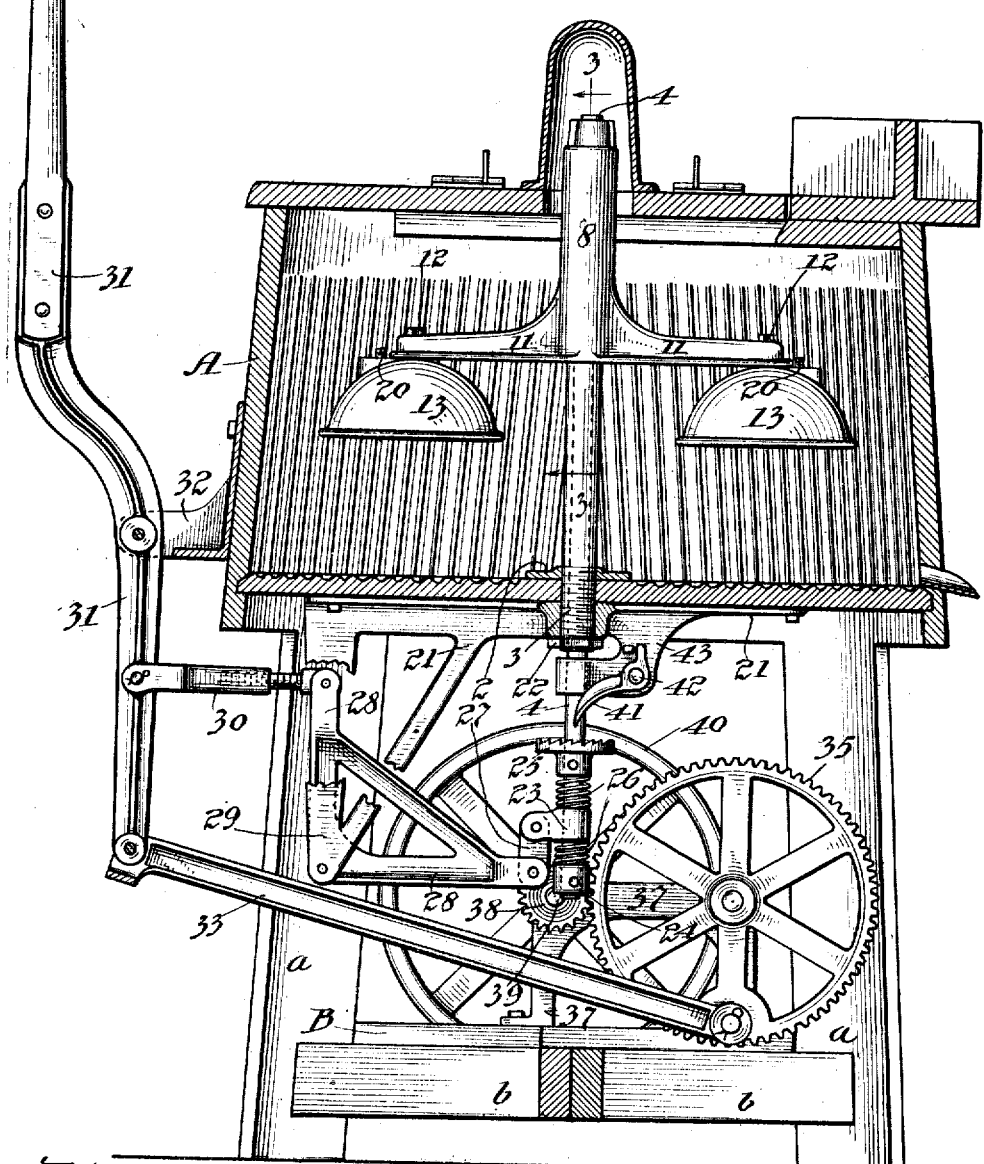
Fig. 2 is a vertical central section taken on dotted line 2—2, Fig. 1.
Figure 3:
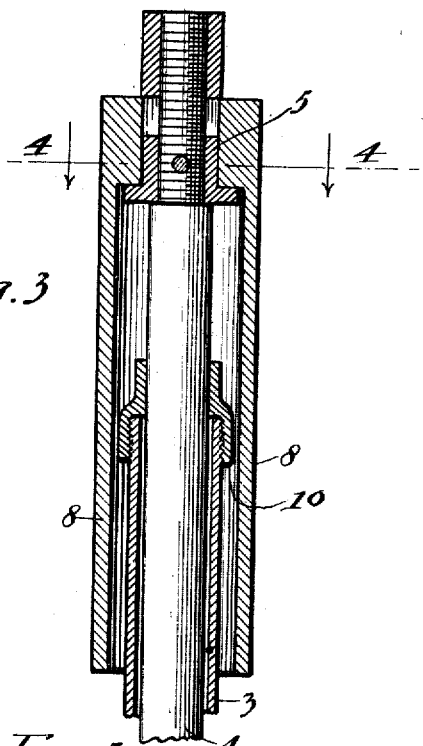
Fig. 3 is a vertical section of the upper broken away portion of the rotary reciprocable shaft and the sleeve supported thereby.
Figure 4:
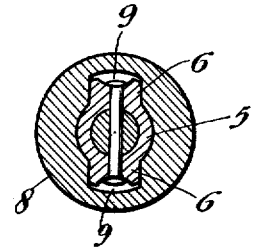
Fig. 4 is a transverse section taken on dotted line 4—4, Fig. 3.
Figure 5:
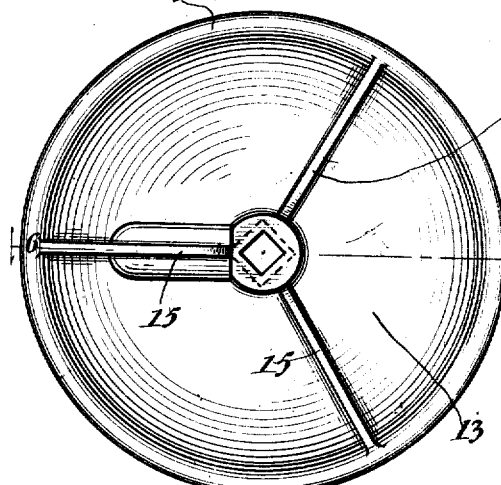
Fig. 5 is a plan view of the underside of one of said cups.
Figure 6:
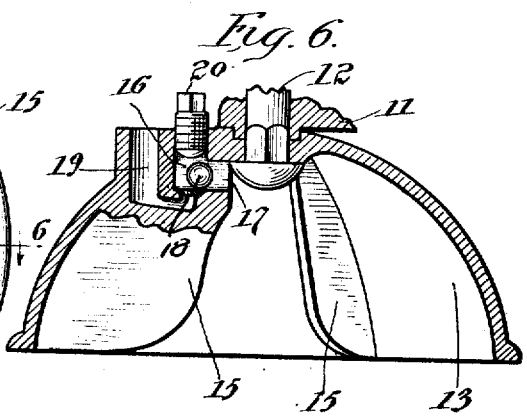
Fig. 6 is a vertical section of said cup taken on dotted line 6—6, Fig. 5.

Referring to the drawings, A represents a suitable tub supported by four legs $a$, $a$, which latter near their lower ends are connected by cross-pieces $b$, $b$, that may be made either of wood or metal, and B represents a platform which is mounted on and secured to said cross-pieces adjacent two of said legs at one side of the machine.

The interior of tub A is corrugated, and the center of the bottom thereof is provided with a depressed seat for the circular base-plate 2 of a tubular post 3 that extends upward therefrom to near the upper edge of the tub and downward to a point below the bottom of the same. A vertically reciprocable intermittently rotatable shaft 4 is journaled in this post whose upper end is screw-threaded, and just below this screw-threaded portion it has a head 5 securely mounted thereon. The lower end of this head is provided with a circumferential flange which is of a diameter greater than that of said post, and above this flange it is reduced in diameter and is provided with vertical ribs 6, 6, that project diametrically opposite each other, and, preferably, have their outer edges grooved.

A sleeve 8 is mounted over the upper end of shaft 4 and the upper portion of the post and the bore of said sleeve corresponds in diameter to that of the circumferential flange of the head. The upper end of sleeve 8 is provided with a restricted opening 9 the shape of which conforms to the contours of a horizontal section of the head above its circumferential flange so that when the sleeve is slipped down over the top of the shaft and properly turned, ribs 6, 6, of said head will enter the wider ends of opening 9 and the shoulder made by reducing said opening will rest upon the flange of said head and be supported thereby. Near the upper end of post 3 it is provided with a collar 10 that corresponds in diameter to the bore of the lower portion of the sleeve so that when said sleeve is properly mounted on the said shaft of this collar and the circumferential flange of head 5 will center the sleeve and prevent lateral vibration of the same. The lower portion of the sleeve is provided with two diametrically oppositely projecting corresponding arms 11, 11, the outer ends of which are provided with vertical openings for the reception of bolts 12, which latter extend up through the center of inverted cups 13, and have nuts 14 screwed onto their upper screw-threaded ends to retain them and said cups in place.

The under or concaved sides of these cups are provided with a plurality of radial equidistant ribs 15, and the upper end of one of these ribs, near the center of the cups, is thickened and provided with an exhaust chamber 16 therein that has a suitable port 17 connecting the upper portion of the chamber with an upper central area of the cup.

These chambers are provided with J-shaped exhaust passages 19, 19, that extend downward from the bottoms of the chambers and then upward alongside of the same and discharge from the central portion of the upper convexed sides of the cups, substantially as shown. Each of these chambers is provided with a ball-valve 18 which is adapted to be seated in the adjacent opening or mouth of passage 19, and the upper end of said chamber has a tapped opening made therein which is closed by a suitable tapped screw 20. This latter opening is made for the purpose of inserting the ball-valve, and when this is accomplished it is tightly closed by the nut.

Post 3 extends down through a boss in the supporting-plate 21 of a hanger, which is secured to the underside of the bottom of the tub and has a nut 22 screwed onto its lower screw-threaded end by means of which the post is securely clamped in its vertical position in the tub. Shaft 4 extends down through this boss a suitable distance, and near its lower end has a sleeve 23 slidably mounted thereon between a suitable collar 24 on the lower end of the shaft and a crown-ratchet 25 on the shaft above it and coil-springs 26, 26, are interposed between said sleeve and said collar and between said sleeve crown-ratchet.

This last mentioned sleeve 23 is provided with lugs projecting therefrom between which one end of a short link 27 is pivotally connected. The opposite end of this link 27 is pivotally secured to the adjacent end of a right angle triangular-shaped rocking-beam 28, which is fulcrumed near the vertex of its right-angular sides to a suitable stud projecting laterally from the lower end of a pendent arm 29 depending from the outer end of supporting-plate 21.

The end of the hypotenuse side of the rocking-beam opposite that connected to sleeve 23 is connected, through a medium of another longer link 30, to the lower branch of a vertically disposed lever 31, which latter is fulcrumed between the projecting pivotal lugs of a bracket 32 secured to the side of the tub. The lower branch of this lever terminates below where link 30 is pivotally connected thereto and has a pitman 33 pivotally connected to its lower end that extends horizontally past shaft 4 and has its opposite end pivoted on a wrist-pin 34 projecting from a large gear 35. This large gear 35 is suitably secured on the end of a horizontal shaft that is journaled in bearings in one end of a table-shaped frame 37 that is supported upon and secured to platform B. This gear engages a pinion 38 secured on the adjacent end of a second horizontal shaft 39, which is parallel to shaft 36 and is likewise journaled in bearings in said frame 37. The end of this shaft 39 opposite pinion 38 extends beyond its bearings and has a suitable balance-wheel 40 securely mounted on the same.

In operation, when the upper end of lever 31 is grasped and oscillated back and forth it imparts motion to rocking-beam 28 simultaneously with the balance-wheel gearing. The end of the rocking-beam connected to sleeve 23 slides shaft 4 upward and downward, and when this shaft is at the limit of its upward movement the teeth of crown-ratchet 25 are engaged by a pawl 41 that is pivoted to a stud 42 projecting laterally from a bracket 43 made integral with and depending from supporting-plate 21 and imparts an intermittent rotation to shaft 4 when it is approaching the limit of its upward motion. This bracket projects in a horizontal direction past stud 42 and it has a boss on its end for assisting in guiding the vertical reciprocations of shaft 4. This extension of the bracket may be dispensed with, if desired.

What I claim as new is:—

1. Mechanism of the kind described comprising a suitable support, a vertically reciprocable shaft extending up through the bottom of said support, vertically vibrating devices carried by the upper end of said shaft, mechanism below said receptacle for simultaneously revolving said balance-wheel and reciprocating said shaft, and means including a crown-ratchet secured to said shaft, and a pendent pivoted pawl adapted to engage said ratchet when said shaft is moving upward and imparts an intermittent rotating movement thereto.

2. Mechanism of the kind described comprising a suitable support, a tubular post extending up through the bottom of said support, a plate secured to the underside of said support through which the lower end of said post extends, a vertically reciprocating shaft journaled in said post, a crown-ratchet secured to said shaft below the lower end of said post, a pendent pawl pivoted to said plate and adapted to engage said ratchet during the upward movement of the shaft and impart an intermittent rotation thereto, and lever actuated mechanism below said support for reciprocating said shaft.

3. Mechanism of the kind described comprising a suitable support, a tubular post extending up through the bottom of said support, a plate secured to the underside of said support through which the lower end of said post extends, a vertically reciprocating shaft journaled in said post, a crown-ratchet secured to said shaft below the lower end of said post, a pendent pawl pivoted to said plate and adapted to engage said ratchet during the upward movement of the shaft and impart an intermittent rotation thereto, lever actuated mechanism below said support for reciprocating said shaft, and a yielding device for connecting said mechanism and shaft.

4. Mechanism of the kind described comprising a suitable support, a tubular post extending up through the bottom of said support, a plate secured to the underside of said support through which the lower end of said post extends, a vertically reciprocating shaft journaled in said post, a crown-ratchet secured to said shaft below the lower end of said post, a pendent pawl pivoted to said plate and adapted to engage said ratchet during the upward movement of the shaft and impart an intermittent rotation thereto, lever actuated mechanism below said support for reciprocating said shaft, and a balance-wheel revolved by said mechanism at the same time it reciprocates the shaft.

5. Mechanism of the kind described comprising a suitable support, a tubular post extending up through the bottom of said support, a plate secured to the underside of said support through which the lower end of said post extends, a vertically reciprocating shaft journaled in said post, a crown-ratchet secured to said shaft below the lower end of said post, a pendent pawl pivoted to said plate and adapted to engage said ratchet during the upward movement of the shaft and impart an intermittent rotation thereto, lever actuated mechanism below said support for reciprocating said shaft, a yielding device for connecting said mechanism and shaft, and a balance-wheel revolved by said mechanism at the same time it reciprocates the shaft.

6. Mechanism of the kind described comprising a suitable support, a vertically reciprocable shaft extending up through the bottom of said support, vertically vibrating devices carried by the upper end of said shaft, mechanism below said support for reciprocating said shaft, including a rocking-beam under said support which is connected at one end to said shaft, and a lever fulcrumed between its ends to the side of said support and adapted to rock said beam.

7. Mechanism of the kind described comprising a suitable support, a vertically reciprocable shaft extending up through the bottom of said support, vertically vibrating devices carried by the upper end of said shaft, mechanism below said support for reciprocating said shaft, a rocking-beam under said support, a yielding collar on said shaft, a link connecting said collar and rocking-beam, a lever fulcrumed between its ends to the side of said support, and a link for connecting said lever and rocking-beam.

8. Mechanism of the kind described comprising a suitable support, a vertically reciprocable shaft extending up through the bottom of said support, vertically vibrating devices carried by the upper end of said shaft, mechanism below said support for reciprocating said shaft, a rocking-beam under said support which is connected at one end to said shaft, a lever fulcrumed between its ends to the side of said support and adapted to rock said beam, and a balance-wheel actuated by said lever at the same time the latter imparts motion to said rocking-beam.

9. Mechanism of the kind described comprising a suitable support, a vertically reciprocable shaft extending up through the bottom of said support, vertically vibrating devices carried by the upper end of said shaft, mechanism below said support for reciprocating said shaft, a rocking-beam under said support, a yielding collar on said shaft, a link connecting said collar and rocking-beam, a lever fulcrumed between its ends to the side of said support, a link for connecting said lever and rocking-beam, and a balance-wheel actuated by said lever at the same time it imparts motion to said rocking-beam.

10. Mechanism of the kind described comprising a suitable support, a vertically reciprocable shaft extending up through the bottom of said support, vertically vibrating devices carried by the upper end of said shaft, mechanism below said support for reciprocating said shaft, a rocking-beam under said support which is connected at one end to said shaft, a lever fulcrumed between its ends to the side of said support and adapted to rock said beam, a pitman connected at one end to said lever and extending under said support, a balance-wheel, and speed increasing gearing driven by said pitman and connecting the same and said balance-wheel.

In witness whereof I have hereunto set my hand this 2nd day of Sept., 1916.

SAMUEL T. WHITE.

Witnesses:
H. W. Power,
I. Scheller.